May 20, 1952 F. C. MELCHIOR 2,597,253
JET-PROPULSION NOZZLE
Filed Nov. 13, 1945 3 Sheets-Sheet 1

Inventor
Frederick C. Melchior
By
Munn, Liddy & Glaccum
Attorneys

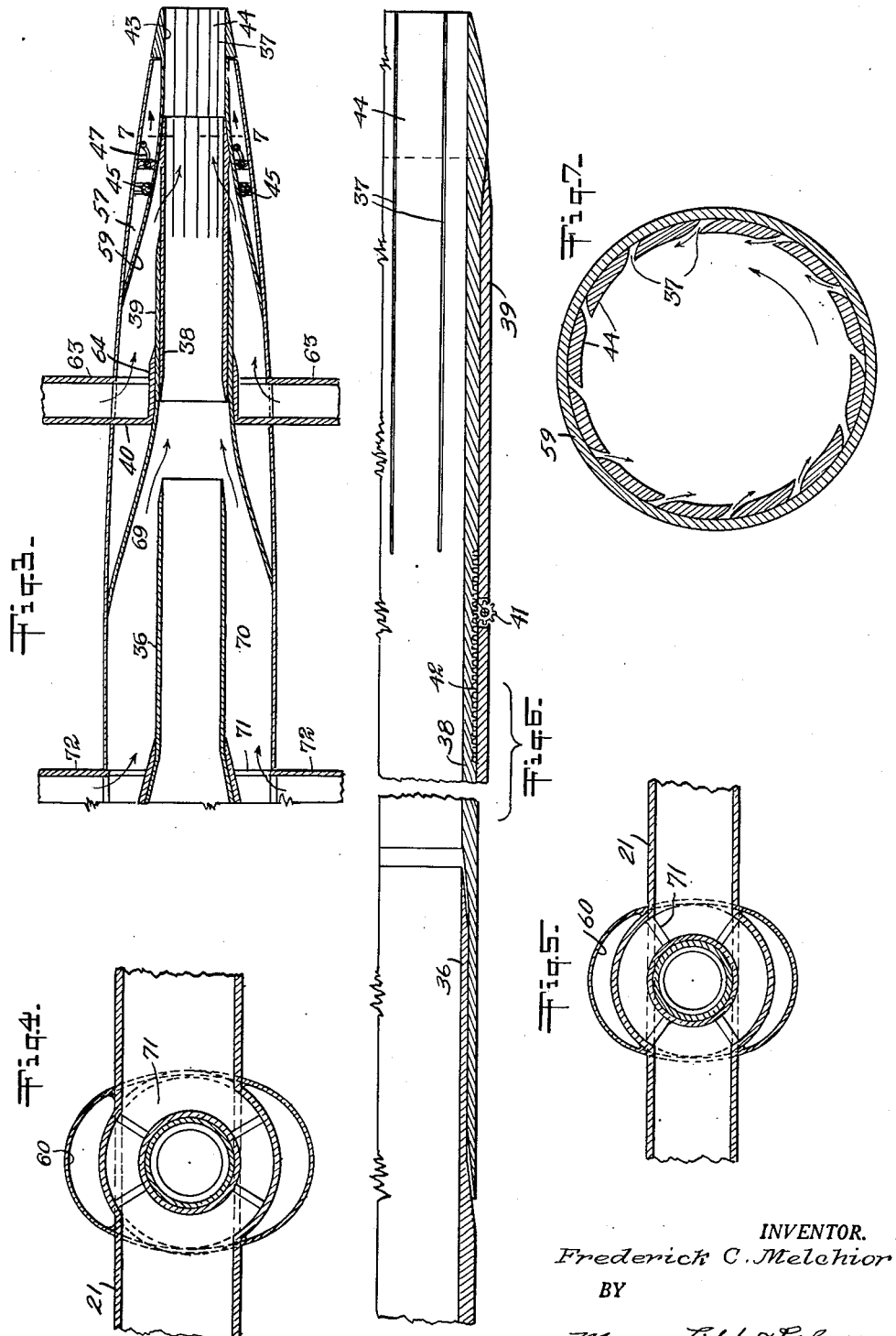

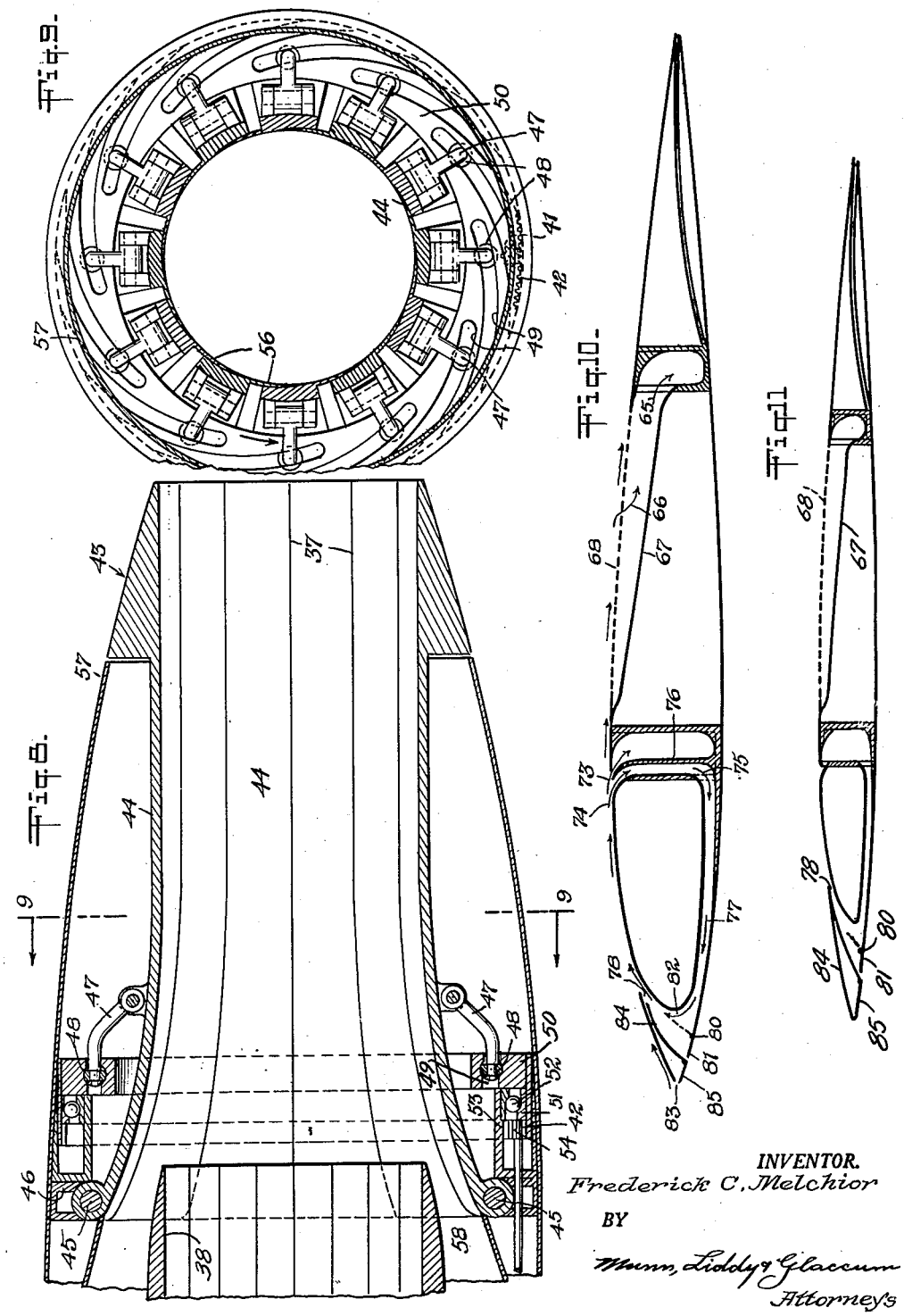

Patented May 20, 1952

2,597,253

UNITED STATES PATENT OFFICE 2,597,253

JET-PROPULSION NOZZLE

Frederick C. Melchior, New York, N. Y., assignor of one-half to Effie B. Melchior, New York, N. Y.

Application November 13, 1945, Serial No. 628,114

4 Claims. (Cl. 60—35.5)

This invention relates to aircraft and more specifically to power plant installations of the combustion turbine type in which the kinetic energy of the exhaust gases or products of combustion is utilized to obtain propulsive thrust horsepower together with improved aerodynamic efficiency of the aircraft.

One object of the invention is to provide for a most direct and efficient discharge of the exhaust gases or products of combustion so as to obtain maximum effective thrust horsepower.

Another object is to provide suitable means for varying velocity versus mass flow of gases and auxiliary air—through proper nozzle design and installation—so as to sustain adequate thrust horsepower throughout the speed range of the aircraft.

A further object of the invention is to improve the efficiency—more particularly the maximum lift coefficient—of the airfoil by employing the kinetic energy of the exhaust gases, in a manner as hereinafter described, for generating induced flow of auxiliary air, said flow to be taken at will from back suction on the boundary layer off the top of the airfoil, and thus to substantially increase aforesaid speed range.

A still further object is to provide suitable means for shifting at will aforesaid induced flow from the top of the airfoil to ram scoops in the nacelle whenever back suction on the boundary layer is not required, as for example in normal level flight cruising.

It is also an object of this invention to provide simple and practical means for connecting existing structural members of the airfoil to suction chambers where induced flow is generated, and to utilize such structural members for most uniform transmission of aforesaid back suction over desired portion of the airfoil.

Back suction on the boundary layer of an airfoil has long been a desired objective on the part of aerodynamicists, and numerous schemes for accomplishing it have been suggested in the past—none of which has so far appeared practical for translation into practice. Induced flow is also well known to the science of fluid mechanics and has long been employed in various applications, such as vacuum pumps, steam jet exhausters for condensers, etc. Thus, it is evident that nobody can claim the basic principles of induced flow and back suction on the boundary layer as proprietary innovations to the art. It is, therefore, not my intention to endeavor to establish such claims, but rather to present herewith a simple and practical solution in the nature of a preferred structure which, as will be seen from the ensuing description, will admirably accomplish the foregoing desiderata.

The exact nature of the invention, together with its several objects, may best be understood from the accompanying drawings embodying the various details of apparatus for carrying the invention into effect.

Referring now to said drawings—

Fig. 3 is in part a view similar to Fig. 2 with the parts in a different operating position.

Fig. 4 is a cross-sectional view taken on the line 4—4 of Fig. 1.

Fig. 5 is a cross-sectional view taken on the line 5—5 of Fig. 1.

Fig. 6 has an enlarged detailed view of a portion of the operating mechanism.

Fig. 7 is a cross-sectional view taken on the line 7—7 of Fig. 3.

Fig. 8 is a detailed sectional view of a variable rear jet forming a part of my invention.

Fig. 9 is a cross-sectional view taken on the line 9—9 of Fig. 8.

Fig. 10 shows a section of the airfoil near the center section.

Fig. 11 shows a section of the airfoil of an outer wing panel.

Figure 1:
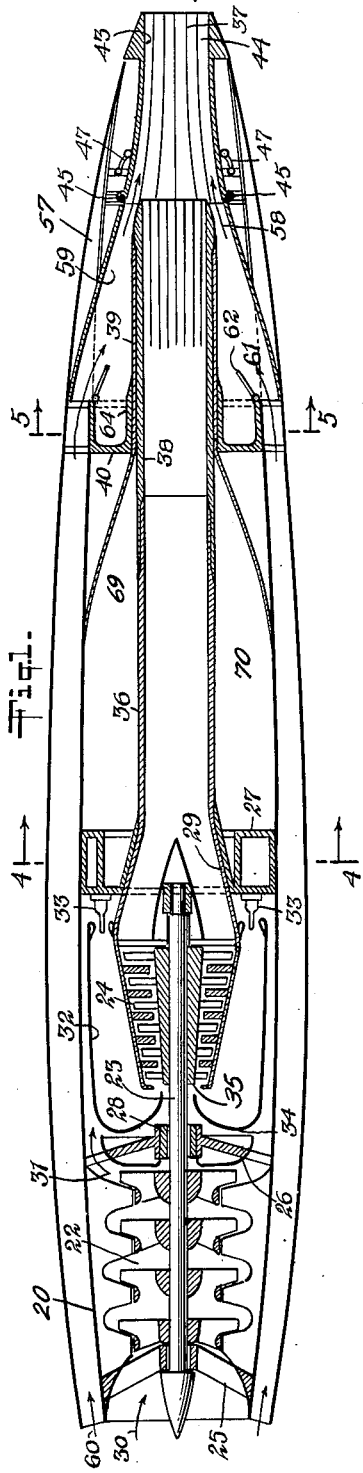
Fig. 1 is a longitudinal section in the vertical plane of a power plant designed in accordance with the invention.
Figure 2:
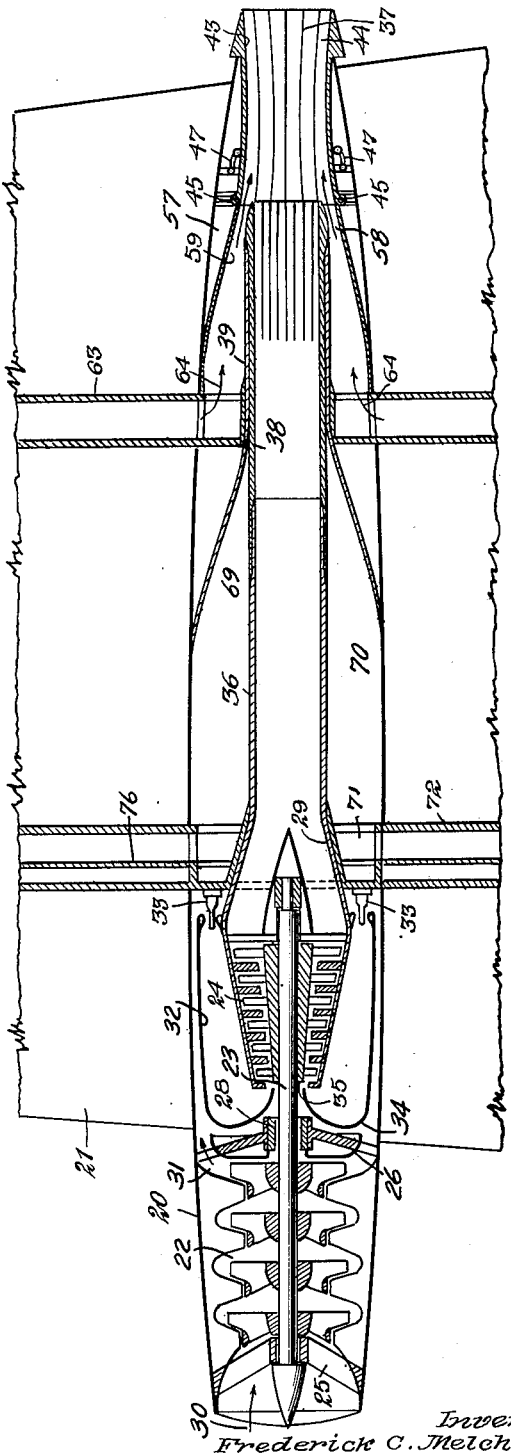
Fig. 2 is a longitudinal section of the same power plant taken in the horizontal or lateral plane.

As may be seen from Fig. 1 and Fig. 2, the power plant chosen to illustrate my invention is of the multi-stage gas turbine type of such size and power as may be suitable for installation in wing nacelles of large multi-engine aircraft. It is to be noted that the exact nature, size and potential output of the power plant will in no way affect the scope and usefulness of my invention which can be used with any type of internal combustion engine or turbine discharging exhaust gases or products of combustion at high temperatures. The choice of multi-stage installation will be dictated primarily by the amount of power required at high altitudes as, undoubtedly, with a single-stage installation it would be difficult to obtain, say, 10,000 or more thrust horsepower per unit for stratosphere flying. The illustration as here presented is, therefore, only to be construed as an example of what I consider an approach to the optimum of an installation in large future aircraft, and it must in no case be interpreted as constituting any limitation relative to scope and usefulness of the invention as it is hereinafter set forth. The type shown is similar to that shown and described in the patent to A. Lysholm, No. 2,085,761.

Referring to Figures 1 and 2, the power plant illustrated is installed in a nacelle 20, which is an integral part of wing 21, shown in a broken view with structural members pertinent to the invention.

The prime mover of the power plant consists of a multi-stage compressor 22 on a common shaft 23 with multi-stage turbine 24. It is suspended in the nacelle by means of radially spaced structural members 25 and 26 and front wing spar structure 27, which hold bearings 28 and turbine casing 29 rigidly relative to the structure of the nacelle. Air for the combustion enters the first stage of the compressor through front aperture 30 under ram created by the forward velocity of the aircraft, is compressed through the several stages of the compressor to a ratio, say, of 6:1, whereupon it is discharged by way of annular passage 31 into combustion chamber 32 where it is heated in the process of combustion together with fuel injected through a series of nozzles 33. In this manner the air becomes preheated for the combustion while serving as an ideal insulator for the combustion chamber. In addition, a small amount of air from the compressor flows through by-pass 34 to the hub of turbine rotor 35 which, thus, it protects against overheating. The motive fluid comprising the products of combustion at an entrance temperature of, say, 1800° Fahrenheit is then partly expanded through the several stages of the turbine where it expends a certain amount of its kinetic energy of heat, required for the work of driving the compressor, whereupon it is expelled rearwardly at high velocity into discharge pipe 36, suspended rigidly and jointly with turbine casing 29 in front spar nacelle structure 27.

The prime mover, as part of this power plant, is of accepted design known to the art and is, therefore, not claimed by me as part of this invention; it is merely shown to exemplify a suitable power unit for this type of installation.

Rearward flow of the motive fluid continues through pipe 38 connecting with pipe 36 by means of a sliding fit, as indicated in Fig. 5, and slidably mounted in sleeve 39 which in turn is rigidly mounted in rear spar structure 40 of the wing. The rear portion of slidable member 38 contains a series of longitudinal spaced Venturi slots 37 extending from about midway clear through to the rear end, as shown in Fig. 6. These slots when in the open position are so constructed that air rushing by them will be drawn into the tube by Venturi action. As may be seen from Fig. 6, a slight increase in the thickness of the material provides for a gradual increase in outer diameter immediately prior to the final taper to the rear end. Thus, with some spring action in the longitudinal members between aforesaid Venturi slots, the rear end of sliding member 38 may be choked or opened a few degrees minus or plus its cylindrical position by merely moving it fore and aft by means of a pinion 41 meshing with rack 42 which is integral with member 38 and emerges through a slot in sleeve 39. This motion will, of course, correspondingly decrease or increase the aforementioned Venturi slots—an important factor in the functional utility of the invention in cases where the prime mover imparts a high rotational velocity on the exhaust gases or products of combustion.

From the rear end of pipe 38 the motive fluid is discharged through rear jet 43 which, as may be seen from Figures 1 and 8, has the shape of a Venturi throat. Turning now to Figures 8 and 9, it will be seen that rear jet 43 is composed of a series of spaced longitudinal members 44 hinged on individual pivots 45 which in turn are supported by annular structural member 46. Hinged to each longitudinal member are individual push and pull rods 47 with rollers 48 inserted in eccentrically disposed slots 49 in annular ring 50 riding by means of sleeve 51 on ball thrust bearing 52 which is held in place by annular structural member 53. A small pinion 54 meshing with internal gear 55 on sleeve 51 will cause ring 50 to rotate in desired direction, whereby slots 49 governing push and pull rods 47 will move longitudinal members 44 toward or away from center in a manner obvious from the illustration in Figures 8 and 9.

Turning now specifically to Fig. 9, it will be seen that longitudinal members 44 have integral overlapping shields 56 serving to seal the spaces between the members. A closer examination of the cross section reveals that the radii of the inner surfaces of the individual members are somewhat offset from the center of the assembly, while those of the inner surfaces of the shields are substantially larger than the average inner radius of the cross section. In this manner the inner surface of the jet will always present a sufficiently close approach to the periphery of a circle so that, while in no position mathematically perfect, it can for all practical purposes be considered so.

The maximum opening of the rear jet is governed primarily by the clearance of the nacelle cowl 57 and the location of pivotal points 45. Inasmuch as these factors can be modified to suit the requirements of each installation, the element of degree is irrelevant to the nature and scope of the invention. As shown, the operating range of the jet is ample to allow for adequate variation of velocity versus mass flow of gases to suit the speed range of aircraft. It should also be noted that the design of the jet—more particularly, the shape of the longitudinal members—is such that, regardless of the degree of opening, it will always represent a true venturi. This is a very important factor in maintaining optimum efficiency of jet propulsion as well as of induced flow.

Between the rear end of slidable member 38 and pivots 45 is an annular passage 58 leading into rear jet 43 from annular chamber 59 surrounding sleeve 39. Ram scoops 60 lead directly into chamber 59 through crescent shaped apertures 61 which will be closed off by means of a series of shutters 62 when certain flight conditions require back suction on the boundary layer on top of the airfoil. These shutters may be of the cowl flap type, as now used on conventional aircooled engine installations, or of any other suitable type known to the art.

In a similar, direct manner, rear spar 63 of the wing communicates with chamber 59 through apertures 64 in rear spar structure 40 in the nacelle, as indicated more clearly in Fig. 2. Rear spar 63 is of the box type, sealed except for forward apertures 65 extending substantially throughout its length and interrupted only by necessary bracing structure. Through said apertures the rear spar is openly connected to chamber 66 which is enclosed by structural member 67 and sheet metal skin 68, and extends substantially throughout the span of the wing. The structural member 67 seals chamber 66 from the rest of the airfoil and may well be formed of corrugated sheet metal, while skin 68 comprising part of the top cover of the airfoil contains, in the area covering chamber 66, a multitude of fine densely spaced perforations having a diameter of, say, 1/64 of an inch. Being of straight cylindrical section and substantially perpendicular to the top surface of the airfoil, they will not interfere with the smooth laminar flow and, therefore, not impair the high speed characteristics of the wing in normal level flight.

Thus it is seen how existing structural members such as rear spar 63 of the wing may be easily adapted to serve the purpose of uniformly transmitting suction to the boundary layer on top of the airfoil. Other exclusive features of this airfoil have been illustrated and explained in my patent termed "Self-Energizing Airfoil," No. 2,427,972, issued September 23, 1947.

For a better understanding of the functioning of this invention, reference is made to fundamentals of fluid mechanics dealing with the flow of a fluid past or through a venturi. We now turn again to Fig. 1 illustrating the approximate relative positions of operating parts in normal level flight at cruising altitudes. As the motive fluid passes from sliding member 38 into rear jet 43 it creates a powerful suction through passage 58, at the same time as cold air from ram scoops 60 enters chamber 59 whence it mixes with the exhaust gases or products of combustion as they emerge from member 38. This increases the total mass flow of motive fluid discharged from rear jet 43, thus augmenting the effective thrust horsepower attainable at practicable aircraft speeds. While in this condition apertures 61 are open, with shutters 62 in a position as suggested in Fig. 1, it is not necessary to close apertures 64, as air entering under ram will of necessity prevail over that which would be drawn from a reduced pressure area such as exists on the top surface of an airfoil.

In cases where a particular type of prime mover expels its exhaust gases or products of combustion at a high rotational velocity, in addition to the rearward velocity, the resultant is a helical velocity representing the total kinetic energy of which only the rearward component renders propulsive effort. In order to also utilize the kinetic energy embodied in the rotational velocity of the motive fluid, the aforementioned Venturi slots 37 in slidable member 38 are designed to converge from the outer to the inner surface with the rotation of the motive fluid, as indicated by arrows in Fig. 7. The rotational velocity of mass flow past said Venturi slots where they extend beyond sleeve 39 has an effect which is identical in principle to that of the rearward mass flow on passage 58, in that it causes a pressure drop with consequent suction of cold air through the Venturi slots from chamber 59, thus further augmenting the total mass flow for added thrust.

Referring again to fundamentals, we know that effective horsepower is a product of force × velocity and, likewise, that maximum potential horsepower of a given machine or prime mover is limited by the optimum amount of energy it can handle. For extreme speeds at very high altitudes it may, therefore, be desirable to somewhat reduce the total mass flow of the motive fluid—by slightly decreasing the induced flow in slots 37 as well as in passage 58—so as to correspondingly increase its velocity. This is accomplished by moving member 38 forward a short distance so that its enlarged portion is partly forced into sleeve 39, whereby its rear end is choked down to a smaller diameter and slots 37 narrowed a proportionate amount, at the same time as rear jet 43 is choked down to a corresponding degree.

The higher efficiency of thrust horsepower, obtained through such reduced mass flow at increased velocity to match extremely high aircraft speeds, may have an analogy in the principle of operating an automobile in over-drive.

Considering now the lower range of aircraft speeds, such as prevail in take-off, steep climbs and landing, it is evident that operation in a "lower gear" will render greater efficiency of thrust horsepower. In jet propulsion terms this means increased mass flow through greater cross sectional area at decreased velocity and is accomplished by moving member 38 rearward a short distance aft of position shown in Figure 1, allowing spring action in its longitudinal members between slots 37 to flare out and substantially increase the diameter of its rear end. With a correspondingly increased opening of rear jet 43, this will greatly augment the induced flow from chamber 59. The increased mass flow, discharged at a lower velocity through a larger cross sectional area, will thus produce a great increase in thrust or propulsive force, thereby sustaining adequate thrust horsepower also in the lower speed range.

As has been previously pointed out, back suction properly applied to the boundary layer of an airfoil will greatly increase the maximum lift coefficient and help sustain smooth laminar flow over the wing with increased lift over a wider range of angles of attack. While this is desirable throughout the lower speed range of the aircraft, it is especially important in landing where reasonable minimum speeds are a matter of safety. In this condition, with increased induced flow and maximum total mass flow at reduced velocity obtained in a manner as described in the preceding paragraph, shutters 62 will close apertures 61 of ram scoops 60, causing all of the induced flow of air to be taken from the top surface of the airfoil via rear spar 63 and apertures 64.

Turning now to Fig. 3, there is illustrated an additional alternative with member 38 in the extreme rearward position, joining rear jet 43 in forming a continuous discharge passage, closing off passage 58 and opening up passage 69 leading into annular chamber 70 surrounding discharge pipe 36. Induced flow by the rearward velocity of the motive fluid occurs now in passage 69, with suction transmitted through chamber 70 and via apertures 71 to front spar 72. Like rear spar 63, front spar 72 is of the box type, hermetically sealed except for apertures 73, 74 and 75, but unlike rear spar 63 it is divided into two compartments by a separation wall, structural member 76, extending throughout the center section or the portion of the span where the thickness ratio of the airfoil is at or near its maximum. Apertures 73 and 74 are in the nature of slots in the top surface of the airfoil, designed neutral relative to the laminar flow so as to allow neither impact flow into them, nor Venturi suction out of them. Extending over the same portion of the span as wall 76, slot 73 leads into the rear compartment which is sealed off from the rest of the front spar interior but communicates with chamber 70 via apertures 71 in front spar nacelle structure 27, thus utilizing induced flow suction in passage 69 for augmenting back suction on the boundary layer at this point of the airfoil in a most direct manner.

Extending substantially over the entire span, slot 74 leads into the front compartment of front spar 72, communicating via aperture 75 and forward passage 77 with leading edge slot 78. In this manner, Venturi suction created by the high velocity air flow over slot 78 is transmitted directly to slot 74 for effective back suction on the boundary layer over a range of angles of attack. For more detailed information relative to this particular airfoil feature, reference is again made to my previous application "Self-Energizing Airfoil."

The passage of air over the Venturi slot 78 causes a strong suction through this slot. Pivoted at 80 there is provided a flap 81 which is closed in normal flight. When the wing enters upon high angles of attack, as, for instance, in landing where maximum lift is desired, the flap 81 is opened to a position as shown by the dotted lines. The air flow then enters the passage 78 from below, producing Venturi action at about the point 82. To further augment smooth laminar flow a small aperture or slot 83 in the leading edge of the wing may be opened a desired amount. The opening 83 may be controlled by the member 85.

Looking now at member 38 in Figure 3, we note that slots 37 are exposed to practically their entire length as it protrudes rearward from sleeve 39. In cases where the motive fluid possesses a high rotational velocity—and slots 37, therefore, are not sealed—this means considerable induced flow through said slots from chamber 59, resulting in appreciable back suction on the boundary layer through rear spar 63 and chamber 66. Furthermore, opening or choking rear jet 43, whereby its inside diameter at the termination point of member 38 is proportionately increased or decreased, will cause the rear end of member 38 to correspondingly flare open or choke, with consequent increase or decrease in the width of slots 37. Thus it is evident that member 38 forms with rear jet 43 a combination variable discharge jet, allowing for great variation of velocity versus mass flow of the motive fluid to suit any given flight condition, in a manner as hereinbefore described.

The arrangement as illustrated in Figure 3, with additional back suction through front spar 72, may be especially effective in cases where the thickness ratio of the airfoil section over part of the span is of necessity relatively high, making it difficult to sustain smooth laminar flow under certain flight conditions such as high speed climb or high speed maneuvering of combat planes. For very thin airfoils in normal operation it may well be of limited utility. It has, therefore, only been illustrated in Figure 10, representing a section of the airfoil at or near the center section, whereas in Figure 11 it has been omitted.

I claim:

1. In an aircraft having a power plant for jet propulsion, a jet, a tubular means running from said power plant to a point adjacent said jet, a sleeve on said tubular means, a plurality of Venturi slots in said tubular means at the jet end thereof, said jet end being cam shaped at its outer edge and means for moving said sleeve against said cam and to contract said tubular means to determine the amount of air passing over the end of said passage.

2. In an aircraft having a power plant for jet propulsion, a tubular member extending from said power plant, a nozzle positioned adjacent the end of said tubular means, a sleeve on said tubular member adapted to control the distance between the end of said tubular member and said nozzle by the movement of said sleeve toward and away from said nozzle, a ram scoop and means controlling said ram scoop whereby a predetermined amount of air may flow through said ram scoop about the end of said tubular member and through said nozzle.

3. In an aircraft having a power plant for jet propulsion a nozzle comprising a plurality of longitudinal members having overlapping shields, means for moving said members toward and away from each other to vary the dimension of said nozzle, tubular means running from said power plant to a point adjacent said nozzle, a sleeve on said tubular means, a plurality of slots in said tubular means at the nozzle end thereof, said end being cam-shaped at its outer ends, and means for moving said sleeve against said cam and to contract said tubular means to determine the amount of air passing over the end of said passage into said nozzle.

4. In an aircraft having a power plant for jet propulsion, a nozzle, tubular means running from said power plant to a point adjacent said nozzle, a sleeve on said tubular means, a plurality of slots in said tubular means at the nozzle end thereof and means to move said tubular means out of said sleeve to vary the distance between the end of the tubular means and the nozzle and to expose said slots so as to control the amount of air flowing over said tubular means to said nozzle.

FREDERICK C. MELCHIOR.

REFERENCES CITED

The following references are of record in the file of this patent:

UNITED STATES PATENTS

| Number | Name | Date |
|---|---|---|
| 81,257 | Cushman | Aug. 18, 1868 |
| 157,526 | Leggett | Dec. 8, 1874 |
| 690,754 | McKechney | Jan. 7, 1902 |
| 1,120,535 | Pruden | Dec. 8, 1914 |
| 1,186,298 | Duc | June 6, 1916 |
| 1,857,556 | Lasley | May 10, 1932 |
| 2,041,791 | Stalker | May 26, 1936 |
| 2,085,761 | Lysholm | July 6, 1937 |
| 2,390,161 | Mercier | Dec. 4, 1945 |
| 2,402,363 | Bradbury | June 18, 1946 |
| 2,411,895 | Poole | Dec. 3, 1946 |
| 2,458,600 | Imbert et al. | Jan. 11, 1949 |
| 2,462,953 | Eaton et al. | Mar. 1, 1949 |
| 2,487,588 | Price | Nov. 8, 1949 |